Nov. 7, 1939.                H. W. WHITBY                2,178,945
         CAPACITOR MOTOR AND CIRCUIT ARRANGEMENT THEREFOR
                    Filed Feb. 19, 1937
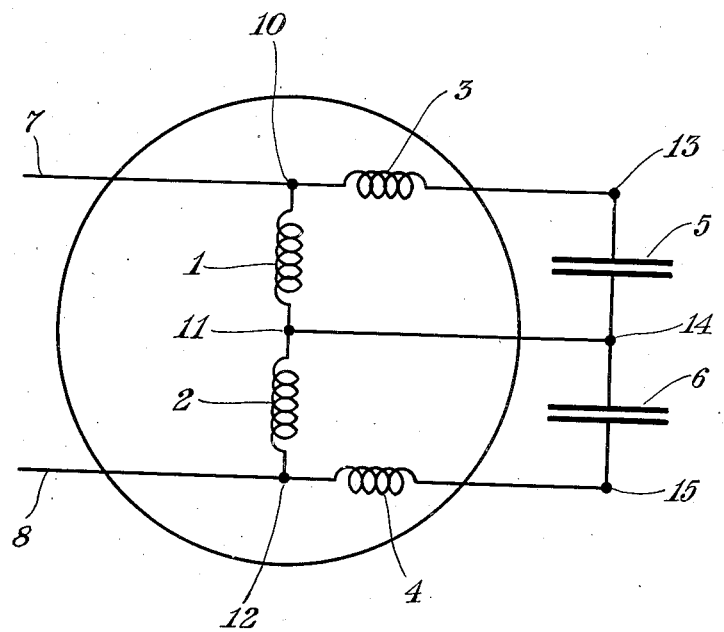
                                        INVENTOR.
                                    HARVIE W. WHITBY
                         BY
                                    Dorsey & Cole
                                        ATTORNEYS Patented Nov. 7, 1939

2,178,945

UNITED STATES PATENT OFFICE 2,178,945

CAPACITOR MOTOR AND CIRCUIT ARRANGEMENT THEREFOR

Harvie W. Whitby, Dayton, Ohio, assignor to Sprague Specialties Co., North Adams, Mass., a corporation of Massachusetts Application February 19, 1937, Serial No. 126,713

2 Claims. (Cl. 172—233)

The present invention relates to capacitor motors and circuit arrangements therefor.

As is well known, capacitor motors usually employ condensers both for starting and during running, and because of the inherent low cost of electrolytic condensers various efforts have been made to use electrolytic condensers in such applications.

Such efforts have been partly successful to the extent that dry electrolytic condensers have been used to a considerable extent across low voltages (100 to 200 volts) as starting condensers of capacitor motors, in which application the condensers are subjected to short intermittent use and to the above-stated low voltages.

However, in attempts to use dry electrolytic condensers for continuous operation and/or at higher voltages, the condensers fail after short periods of operation, and the higher the voltages the shorter these periods. The main reason for this is the heating up of the condensers, due primarily to the comparatively high power factor of same; such heating up causing a rapid deterioration of the condensers. Artificial means to increase the heat dissipation of the condensers, for example by means of oil-cooling, as described in U. S. Patent No. 1,992,545 to Preston Robinson, are comparatively expensive and not always applicable.

Another solution of this problem, namely the use of a series combination of a plurality of such condensers, has been described in U. S. A. Patent No. 2,011,126 of Robert C. Sprague. In such arrangement by suitable switching means some or all of the condensers may be used for starting condensers as well as running condensers, whereby for starting, the condensers are connected in parallel, and for running, in series.

However, a series combination of two or more dry electrolytic condensers does not always operate satisfactorily for the following reason: When an A. C. voltage is impressed across a series combination of electrolytic condensers, the voltage divides in proportion to the respective impedances of the condensers of the combination. The impedance of each condenser can be considered to be made up of the vectorial sum of a capacitive reactance—corresponding to the series capacity of the condenser—and of a resistance—referred to as the equivalent series resistance of the condenser—which is substantially proportional to the power factor of the condenser.

Notwithstanding careful adherence to exact manufacturing specifications, there are however unavoidable variations among the impedances of the individual condensers of a batch of dry electrolytic condensers, which is mainly due to differences in their capacities, and even if the capacities of two condensers are identical at a given temperature, they are likely to differ at other temperatures on account of differences between the temperature coefficient of capacity of the condensers. In view of this in an A. C. circuit there is an unequal voltage division between two of these condensers forming a series combination. The result of such inequality—however small it may be initially—is that the condenser of the combination which has the smaller capacity and/or of which the temperature coefficient of capacity is smaller, will take up in operation a higher voltage than does the other condenser.

As a result of this inequality, the condenser with the smaller capacity will heat up to a greater extent than the other condenser. While this heating up of the condenser will as a rule increase the capacity of the condenser and thereby reduce the voltage inequality, such tendency of equalization is no satisfactory solution of the problem; first, because it causes the condenser with the smaller capacity to operate at too high a temperature, and secondly, because the equalization is only a temporary one.

In practice for a while indeed the temperature rise causes a more or less satisfactory equalization but after a while, due to the high temperature the electrolyte evaporates, thereby tending to decrease the capacity, and this capacity decrease of the condenser will raise the voltage and then the temperature. In addition the increased voltage may cause further film formation on the anodes of the condenser which thickens the film and further decreases the capacity. As this process, whatever its precise sequence and mechanism may be, is cumulative in its effect, it leads to the ultimate destruction of the condenser having initially the smaller capacity, or the smaller temperature coefficient of capacity.

The present invention has for its purpose to overcome the above difficulties and provide means whereby the voltage distribution across condensers of a series combination remains constant, notwithstanding the initial differences which may exist among the capacities and/or temperature coefficients of capacity of these condensers.

My invention is particularly useful in connection with electrolytic condensers, and shall be described in reference to so-called dry electrolytic condensers, although it should be understood that the inherent advantages of my invention are also manifested in the use of other types of condensers.

In accordance with my invention the condensers used in series combination, and serving either as starting or running condensers or both, are connected across the capacitor motor in the following manner:

Two windings of the motor—usually its two stator windings, referred to as the main and auxiliary windings—are divided each into two halves. The mid-point of the main winding is connected to the junction point of the two condensers of the series combination, and the two halves of the auxiliary winding are interposed between the two free ends of the main winding and the two free ends of the condenser combination, respectively.

In such arrangement unbalancing, i. e., application of a higher voltage across one of the condensers than across the other, is accompanied by an increase of voltage across that half of the auxiliary winding which is adjoining the first-mentioned condenser; this results in current flow through the conductor connecting the junction point of the condensers with the mid-point of the main winding, and as the two halves of the auxiliary winding form secondary windings of equal turns of a transformer, the primary winding of which is the main winding, the above current induces in the two halves of the main winding voltages of equal and opposite values, which tend to prevent a change of voltage distribution across the condensers.

In the drawing forming part of this specification the single figure of the drawing represents a schematic diagram of a circuit according to the invention.

Referring to the drawing, conductors 7 and 8 represent the alternating current supply to which the motor is connected. The main winding of the motor is divided into two equal parts 1 and 2. Windings 1 and 2 are interconnected at 11 and their free ends are connected to conductors 7 and 8 at 10 and 12 respectively. The auxiliary winding is also divided into two equal parts 3 and 4, which are connected with their ends 10 and 12 to the supply conductors 7 and 8 respectively. Interposed between the other ends 13 and 15, respectively, of windings 3 and 4 is a series combination of two A. C. electrolytic condensers 5 and 6. The junction point 14 of condensers 5 and 6 is connected to the mid-point of the main winding 1—2. The rotor of the motor, which is not shown, may be a conventional squirrel cage rotor.

In the arrangement of the drawing the condensers 5 and 6 may be assumed to be used either as starting or running condensers of the capacitor motor.

The condensers 5 and 6 may be of the standard type of A. C. dry electrolytic condensers. Such condensers, as is well known, comprise two filmed anodes of aluminum or other filming metals. These anodes may be of the etched type and may be provided with a film by well-known processes. The electrolyte, which is usually carried by absorbent spacers interposed between the anodes, may be of well-known compositions, for example it may be a pasty electrolyte containing ammonium borate, ethylene glycol, containing some water.

In the arrangement shown in the drawing any tendency of disturbing equal voltage distribution between the two condensers will be automatically counteracted; for example, assuming that the capacity of condenser 5 is smaller than that of condenser 6, the voltage across the series combination of winding 3 and condenser 5 will immediately assume a higher value than is that of the voltage across the combination of winding 4 and condenser 6. As a result thereof current flows between mid-point 11 and junction point 14, and as the auxiliary winding and main windings are in effect the primary and secondary windings of a transformer, there are induced in the main windings 1 and 2 voltages of such value and phases that the tendency of a rise of voltage across condenser 5 and a drop of voltage across condenser 6 is counteracted; with the result that the voltage across condensers 5 and 6 remain unchanged and substantially equal.

The arrangement according to the invention provides for such perfect equalization of the voltage between the series-connected condensers that even if condensers having substantially different capacities are connected in the circuit, the voltage will be the same across the individual condensers and remain indefinitely so; for example, if one condenser is selected as having a capacity of 50% less than the other condenser, the voltage difference across the two condensers is maintained equal within about 1–2%; whereby the small difference in voltage can be accounted for by the ohmic resistance drop in the windings.

While my invention is of particular utility for series combinations of electrolytic condensers, where unbalancing of the voltage across the individual condensers would have detrimental results, my arrangement is also of great utility irrespective of the type of condensers used, wherever an equal voltage distribution across a series combination of condensers is desirable.

While I have described my invention on hand of specific examples and in specific applications, I do not wish to be limited thereto, but desire the appended claims to be construed as broadly as permissible in view of the prior art.

What I claim is:

1. In a single speed capacitor motor, two windings for said motor, one winding being divided into two directly connected equal parts and the second winding being divided into two separate equal parts, and two electrolytic condensers of unequal capacity connected in series and across said windings, the two parts of said second winding being interposed between the ends of said first winding and the free ends of said first winding and the free ends of the condensers, the junction point of said condensers being in direct electrical connection with the midpoint of said first winding.

2. In a single speed capacitor motor, two windings for said motor, one winding divided into two directly connected equal parts and the second winding being divided into two separate equal parts, two electrolytic condensers of unequal capacity connected in series and across said windings, the two parts of said second winding being interposed between the ends of said first winding and the free ends of the condensers, means to equalize and stabilize the voltage between said condensers, said means comprising a direct electrical interconnection between the midpoint of said first winding and the junction of said condensers.

HARVIE W. WHITBY.